United States Patent [19]

Sobotta

[11] 4,063,465
[45] Dec. 20, 1977

[54] MAGAZINE FEEDING MECHANISM FOR DUAL SLIDE PROJECTORS

[75] Inventor: Reinhard Sobotta, Mascherode, Germany

[73] Assignee: Rollei-Werke Franke & Heidecke, Braunschweig, Germany

[21] Appl. No.: 725,140

[22] Filed: Sept. 17, 1976

[30] Foreign Application Priority Data
Sept. 24, 1977 Germany ............................ 2542484

[51] Int. Cl.² ...................... F16H 55/04; F16H 21/40
[52] U.S. Cl. .......................................... 74/436; 74/76; 353/83; 353/94
[58] Field of Search ...................... 353/82, 83, 86, 90, 353/94, 116; 24/436, 76

[56] References Cited
U.S. PATENT DOCUMENTS

| 3,121,368 | 2/1964 | Hall | 353/118 |
| 3,542,464 | 11/1970 | Dimitracopoulis | 353/116 |
| 3,606,526 | 9/1971 | Smith et al. | 74/436 |
| 3,847,472 | 11/1974 | Sobotta | 353/94 |
| 3,884,569 | 5/1975 | Hickey | 353/88 |

Primary Examiner—Steven L. Stephan
Attorney, Agent, or Firm—Stonebraker, Shepard & Stephens

[57] ABSTRACT

Mechanism for feeding a picture slide magazine in such a way that picture slides can be taken out of the magazine in the same order in which they are placed in the magazine, for delivery to two separate projector units of a dual slide projector, and then can be returned to the magazine still in proper order. Two indexing gears rotate in opposite directions about a common axis of rotation. Each gear carries index pins or projections which cooperate with a star wheel or modified Geneva gear as the indexing gears rotate, and the star wheel or Geneva gear drives two pinions which engage a toothed rack on the slide magazine. As two indexing pins located relatively close to each other on one indexing gear pass the star wheel, they rotate the star wheel through two increments, to feed the magazine through two steps in one direction. As a single pin on the other indexing gear moves past the star wheel in the opposite direction, it turns the star wheel through one increment in the opposite direction, thus feeding the magazine through one step in the opposite direction. Thus the magazine is moved with the "pilgrim step" movement necessary when picture slides from a single magazine are to be projected alternately in two separate projector units and are then to be returned in proper order to the original magazine.

12 Claims, 5 Drawing Figures

MAGAZINE FEEDING MECHANISM FOR DUAL SLIDE PROJECTORS

BACKGROUND OF THE INVENTION

This invention relates to dual slide projectors for projecting images of picture slides onto a viewing screen, wherein the two projector units receive slides in alternating succession from a single slide magazine, and more particularly relates to feeding or indexing mechanism for moving the magazine in the proper sequence of steps so that the picture slides may be taken out of the single magazine in succession, in the same order in which they have been placed in the magazine, for delivery alternately first to one and then to the other of the dual projector units, and then may be placed back into the magazine in their original order so that they do not have to be rearranged before being again projected at another viewing event.

Dual projectors receiving slides from a single magazine are known in the art. One example is Carrillo U.S. Pat. No. 3,093,030, issued June 11, 1963. In this patent, however, the slides are not returned to the magazine after being projected, so that there is no provision for moving a magazine with the alternating two steps forward and one step backward (known as a "pilgrim step" movement) which would be necessary if the picture slides were to be returned to the magazine in proper order or sequence.

Another example of a dual projector fed from a single magazine, is my own Sobotta U.S. Pat. No. 3,847,472, dated Nov. 12, 1974. In this patent, the pilgrim step movement of the magazine is accomplished, but it requires specially designed levers, guides, springs, and cam disks, so that it is somewhat complicated.

Other examples of the prior art which may be considered in this connection are Floden U.S. Pat. No. 3,462,215, dated Aug. 19, 1969, and the closely related Jackson U.S. Pat. No. 3,501,232, dated Mar. 17, 1970; also the British patent of Grenier, No. 1,158,150, published July 16, 1969.

An object of the present invention is the provision of an improved and more satisfactory mechanism for accomplishing the desired forward and backward "pilgrim step" movements of the magazine in a more efficient, simple, sturdy, and economical manner, as compared with the prior art.

Another object of the invention is the provision of magazine feeding mechanism which is comparatively simple and inexpensive to construct, sturdy and reliable in use, and not likely to get out of order.

A further object is the provision of such magazine feeding mechanism in a form which will perform the necessary special steps required for the commencement of a projection sequence when a magazine is first inserted into the projector, and the special steps required for returning the last slides to their proper positions at the end of the magazine when the projection sequence is completed, all without requiring any special attention or manipulation on the part of the operator.

A still further object is the provision of magazine feeding mechanism which will operate independently of the slide transfer mechanism which takes slides from the magazine and places them in the respective projection gates of the projector units and then takes the slides back from the projection gates to the magazine, thereby providing magazine feeding mechanism of universal applicability, adaptable to any dual projector regardless of the form of the slide carrier or slide transfer means employed in the projector, and regardless of whether the magazine is arranged at the center between the two dual projector units or whether the magazine is at the outside of one unit, as in my prior patent above mentioned, and regardless of the direction in which slides are removed from and returned to the magazine, and regardless of whether the projector does or does not provide for axial movement of the slide holders or projection gates.

SUMMARY OF THE INVENTION

A picture slide magazine of any desired form or shape has rack teeth in the direction of its feeding movement. Two pinions, slightly spaced from each other in the direction of movement of the magazine, both engage the rack teeth of the magazine. Both pinions are geared to a star wheel or modified Geneva gear, to turn therewith.

Two indexing gears, of considerably larger diameter than the star wheel, rotate in opposite directions on a common axis. One of these indexing gears carries two pins or projections, relatively close to each other, for successively engaging the star wheel or Geneva gear as the indexing gear rotates, in order to turn the star wheel through two increments or steps, each time that the indexing gear moves the two pins past the star wheel. The other indexing gear, rotating in the opposite direction, carries a single pin which engages the star wheel to turn it one step or increment in the opposite direction as this pin passes the star wheel. These movements of the star wheel cause corresponding movements of the pinions which engage the rack teeth of the magazine, to feed the magazine two steps in one direction or one step in the opposite direction, as the case may be.

In the preferred form, the projections or pins which cooperate with the star wheel are duplicated at diametrically opposite points on the indexing gears, so that each gear need turn only half a revolution, rather than a full revolution, to produce the desired feeding movement of the slide magazine.

This gearing arrangement has the special advantage, over the lever and cam operated gears of the kind shown in my patent above mentioned, that it works almost noiselessly, since a positive and frictional movement cycle, interengaging only through toothed gears, is insured for each individual magazine step, ranging from a motor drive to the direct drive of the magazine. The formation of the individual magazine steps themselves results from partial rotations of the indexing gears, a new rotation of which is started for each indexing or magazine feeding cycle by actuation of an electric switching contact. In this manner, the indexing or feeding forces required for the magazine steps for each compartment or pocket of the magazine, are available at the beginning of each indexing cycle or slide change, in the indexing gears rotating in opposite directions and always becoming active at exactly the same point in their respective rotations. A special feature of the noiselessness of the gearing arrangement consists in that the actual indexing or feeding cycle, such as the entry of the indexing pins into the slots of the star wheel or modified Geneva gear, also represent a virtually silent wears-resistant rolling of the functional parts on one another.

The above mentioned duplication of the indexing pins at diametrically opposite points on the indexing gears has the advantage that an indexing cycle is completed after only half a revolution of the indexing gears, rather than a full revolution. This results in a particularly favorable operating condition with respect to the speed of the indexing gears as well as the circumferential speed of the indexing pins arranged on those gears. The complete indexing operations effected with only a half revolution of the indexing gears, require only half the speed that is required when only a single number of the indexing pins is provided, the running noises thus being reduced. Since the drivng friction and the impingement of the indexing pins on the star or Geneva wheel also occur with reduced intensity when the rotational speed is cut in half, the parts are subjected to considerably less wear. Of course the speed could be further reduced by providing three sets or four sets of the indexing pins, spaced symmetrically around the indexing gears. However, it is found that the drive performance of the motor and the indexing gear diameter have a particularly favorable relationship when there are two sets of indexing pins on the indexing gears.

To allow the direction of projection to be reversed at any time, that is, to project the slides in reverse order during the course of projection of the slides from one magazine, in order to repeat the viewing of individual slides or a group of slides, the invention further provides for making the direction of rotation of the indexing gears reversible. In this connection, the indexing pins on one of the indexing gears are stopped for the duration of one indexing gear cycle associated with the slide change. Consequently, these indexing pins do not cause any indexing or feeding of the magazine when the direction of projection is reversed, and the required sequence of the correct return of the slides into the compartments or pockets of the magazine is also correctly observed when a change-over to a reverse projection is effected in the pilgrim step sequence. When such a reversal of the direction of projection occurs, the driving gears bringing about the magazine feeding also remain constantly in positive engagement with one another.

The indexing pins on one of the indexing gears are arranged on a compensating ring, which is movably mounted relative to this indexing gear. This compensating ring has a limited rotational movement relative to the gear on which it is mounted, so that there is, in effect, a lost motion between the indexing gear and the indexing pin, when the direction of rotation of the gear is reversed. This allows the proper sequence of pilgrim step feeding motions to be preserved notwithstanding the reversal of the direction of movement of the indexing gears, when one wishes to go back to one or several picture slides previously projected, or to resume forward projection after an interval of reverse projection.

Provision is also made for interrupting the projection and bringing about the delivery and return of the picture slides at the beginning and end of the group of slides in the magazine.

DESCRIPTION OF THE PREFERRED EMBODIMENT

Figure 1:
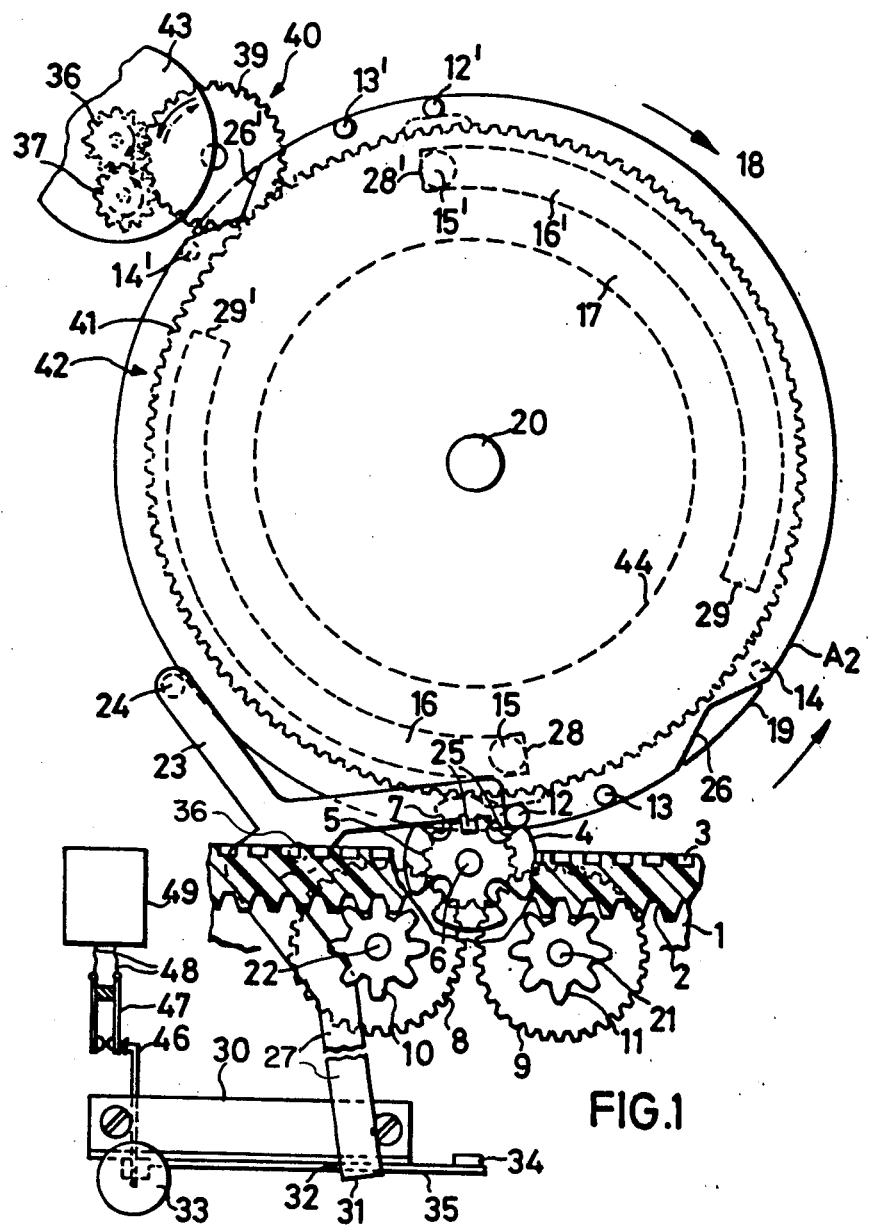
FIG. 1 is a plan view, partly schematic, of magazine feeding or driving mechanism according to a preferred embodiment of the invention, with a fragment of the magazine shown in horizontal section.

A fragment of a magazine for holding a group of picture slides is shown at 1. The magazine has conventional transverse partitions or partial partitions subdividing the length of the magazine into a series of individual pockets or compartments or pigeon-holes, each holding a single individual picture slide. Along the inner face of a longitudinal flange on the magazine there is a series of rack teeth 2. On the outer face of the same flange there is a series of locking teeth 3. The locking teeth 3 are arranged at the same intervals as the spacing of the individual pockets or compartments for holding the picture slides. The rack teeth 2 may have a pitch equal to the spacing of the slide compartments, or may have a pitch which is a multiple of or a fraction of the spacing of the compartments, since the driving steps or increments imparted to the magazine by the mechanism of the present invention do not depend on the pitch of the rack teeth 2, but rather depend on the extent of rotation of driving pinions engaging these rack teeth, as will be apparent below.

There are two magazine driving pinions 10 and 11, both meshing with the magazine rack teeth 2 and rotatable on shafts 22 and 21, respectively, parallel to each other and spaced from each other in the direction of longitudinal movement of the magazine. One pinion is a little ahead and the other a little behind the transverse plane of operation of the claw or transfer mechanism (of conventional kind, and not here shown) which takes an individual slide from the magazine and transports it to one or the other of the two projection gates in the two dual or twin projector units, and then brings the slide back and restores it to its original compartment or pocket in the magazine, after the projection of this particular slide has been completed. The reason for having two driving pinions instead of one, is so that when a fresh magazine is first introduced into the projector, one pinion will be available to make proper meshing contact with the rack teeth 2 at the front of the magazine, and when projection of all of the slides in the magazine is completed and the magazine has reached its last position, beyond and out of contact with the first mentioned driving pinion, the second driving pinion will still be in ample contact with the rack teeth in order to give the proper increments of motion or steps to the magazine at the time that the last projected picture slide is to be returned to its compartment at the rear end of the magazine.

The two magazine driving pinions 10 and 11 are respectively connected rigidly to their respective driving gears 8 and 9, both of which simultaneously mesh with and are driven by a gear 5 rotating on a shaft 6 and rigidly connected to a pair of members 4, one above and one below the horizontal plane of the gear 5. These members 4 may be described as indexing star wheels or cross wheels or modified Geneva gear members. They are similar to the driving portion of conventional Geneva gears, in that they have a series (preferably four, as illustrated) of radial slots for receiving pins on an adjacent indexing gear as further described below, so that as each indexing pin passes the star wheel it will turn the star wheel through a quarter of a revolution. But they are modified with respect to conventional Geneva gears, in that they do not have the locking disk which is part of a conventional Geneva motion assembly and which prevents the turning of the star wheel except when the driving or indexing pin is in the radial slot of the star wheel.

For cooperating with the star wheel 4 to drive them, there are two indexing gears 18 and 19 rotating in opposite directions on a common shaft or hub 20. These indexing gears carry indexing pins 13 and 14, and associate parts as further described below. These indexing gears are rotated by an electric motor 43, through its pinion 36 on the armature shaft of the motor. This pinion 36 meshes simultaneously with a reversing pinion 37 and with an intermediate gear 39 which meshes also with gear teeth 41 on the rim or periphery of the first indexing gear 18. The reversing pinion 37 meshes with a second intermediate gear 40 which, in turn, meshes with gear teeth 42 on the periphery or rim of the second indexing gear 19. In this way, the electric motor 43 will simultaneously drive the first indexing gear 18 in one direction and the second indexing gear 19 in the opposite direction at the same speed. The motor 43 is reversible, and its starting and stopping and direction of travel are controlled by any conventional switching mechanism including a conventional electric switching device indicated schematically at 49.

Figure 2:
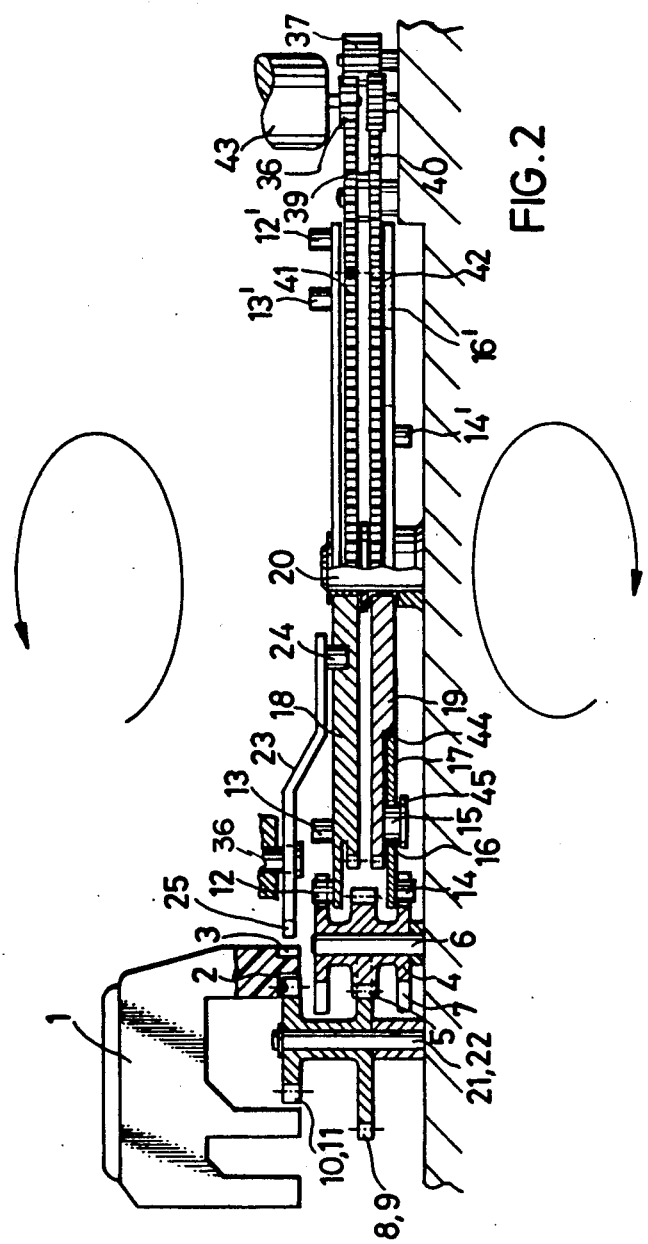
FIG. 2 is a view partly in side elevation and partly in vertical section, of the magazine drive shown in FIG. 1, with some additional parts.

As seen in FIG. 2, the two indexing gears 18 and 19 are located one above the other, slightly spaced from each other in a vertical direction. The previously mentioned star wheel 4 is actually in the form of two star wheels, either formed integrally with or firmly attached to each other and the intervening pinion 5. One star wheel lies just above the plane of the top surface of the upper indexing gear 18, to be driven by indexing cams or pins projecting upwardly from the gear 18, and the other star wheel is in a plane just below the bottom surface of the lower indexing gear 19, to be driven by indexing cams or pins projecting downwardly from below the lower surface of the lower indexing gear 19.

The indexing gear 18 carries, approximately at its periphery, two upwardly projecting indexing pins 12 and 13, spaced a slight distance circumferentially from each other. If the gear 18 rotates in a clockwise direction when viewed from above as in FIG. 1, it is seen that as the pin 12 reaches the star wheel, it will enter a radial slot in the star wheel, will turn the star wheel through a quarter of a revolution, and then just as this pin 12 leaves the radial slot in the star wheel, the next pin 13 will enter the next radial slot and the turn the star wheel another quarter of a revolution. The proportions of the gears are such that a quarter of a revolution of the star wheel will turn the magazine driving pinions 10 and 11 far enough to feed the magazine through one increment or step, that is, to move it along through a space corresponding to the space from one slide pocket or compartment of the magazine to the next slide pocket or compartment thereof. Hence, when the indexing gear 18 is turned far enough to carry both of the pins 12 and 13 past the star wheel, the magazine will be moved through two increments or steps.

If it is desired to arrange the indexing gear 18 to make one complete revolution for a feeding cycle of the magazine, then only one set of the two pins 12 and 13 is provided on the indexing gear. However, as explained above there are advantages in designing the mechanism so that only part of a revolution of the indexing gear is necessary for each cycle of movement of the magazine. Therefore, the pins 12 and 13 are duplicated by similar pins 12' and 13' at diametrically opposite points on the indexing gear, and only half of a revolution of this indexing gear is necessary, each cycle of feeding movement of the magazine. Three sets of these pins 12 and 13 could be provided at spaced intervals around the gear 16, or four sets, in which case only a third of a revolution or a quarter of a revolution of the indexing gear 18 would be needed, to produce one cycle of movement of the magazine as caused by this gear.

The indexing pins 12 and 13 (and 12' and 13') on the gear 18 project upwardly from the upper surface of this gear, into the horizontal plane of the upper section of the star wheel 4. The other indexing gear 19, lying below the gear 18 and rotating at the same speed in the opposite direction, carries one or more indexing cams or gears projecting downwardly from the plane of its lower face, so as to lie in the plane of the lower portion of the star wheel 4. Whereas the pins on the upper gear 18 are in groups of two, to produce a two step or two increment movement of the magazine, there is a single pin 14 on the lower indexing gear 19, to produce only a single step movement of the magazine in a reverse direction, during the same degree or extent of rotation of the indexing gears which produced the two step movement in the first direction. Of course if there are two groups of indexing pins 12, 13 and 12', 13' on the gear 18, then there would be two of the single indexing pins 14 and 14', at diametrically opposite points, on the lower indexing gear 19, or if more than two groups of pins are used on the upper gear, there would be a corresponding number on the lower gear.

If the slides in the magazine were always to be projected only in one order or sequence, the pin 14 (and 14') on the lower indexing gear could be fixedly or solidly mounted on that gear, just as the pins 12, 13, 12' and 13' are in fixed position on the upper gear 18. However, to enable some or several slides to be projected in reverse order without interfering with the proper pilgrim step movement, the pins 14 and 14' on the lower gear 19 are not mounted in fixed position on this gear, but are mounted so as to have a lost motion in a circumferential direction. The pins 14 and 14' are fixed to and project downwardly from what may be called a compensating ring 17, rotatable to a limited extent in a groove 44 formed on the bottom face of the gear 19, concentrically with the axis 20. This compensating ring 17 is held in position by studs 15 and 15' which are fixed to the gear 19 and project downwardly through arcuate slots 16 and 16' in the compensating ring. Enlarged heads 45 on the studs 15 and 15' support the compensating ring 17. The ends 28, 29, 28', and 29' of the arcuate slots 16 and 16' abut against the studs 15 and 15' to limit the extent to which the compensating ring 17 may turn relative to its indexing gear 19.

Assume for example that the upper indexing gear 18 is rotating in a clockwise direction and lower indexing gear 19 in a counterclockwise direction, when viewed from above as in FIG. 1. The pins 15 and 15' on the lower gear 19 will be at the ends 28 and 28' of the slots in the compensating ring, and will carry the compensating ring around with the gear 19, in a counterclockwise direction, so that the indexing pins 14 and 14' will be in the proper relationship to the pins 12, 13, 12', and 13' on the upper indexing gear 18 which is rotating in the opposite direction. Now if it is desired to repeat the projection of the last slide or last group of slides previously projected, the direction of rotation of the drive motor 43 is reversed, so that the upper indexing gear 18 now rotates counterclockwise and the lower indexing gear 19 rotates clockwise. At the beginning of the clockwise movement of the gear 19, the compensating ring 17 will not start to turn with the gear, and will begin to turn only when the pin 28 on the gear 19 reaches the opposite end of the slot 16 and abuts against the end 29', the other pin 15' similarly and simultaneously abutting against the end 29 of the other slot 16'. Then and only then will the clockwise driving of the compensating ring 17 commence this temporary delay or lost motion delay in the movement of the compensating ring upon reversal of direction, may be aided in any desired manner, as for example by the use a stationary frictional drag which will tend to keep the compensating ring 17 from turning until the pins 28 and 28' reach the ends of their respective slots and force the ring 17 to turn notwithstanding the frictional drag.

When the direction of movement of the driving motor is again reversed, to resume projection of slides in the normal sequence rather than the reverse sequence, the same thing happens in reverse. When the lower indexing gear or disk 19 begins to turn counterclockwise rather than clockwise, the compensating ring 17 remains stationary for a short time, until the pins 28 and 28' reach the opposite ends of the respective slots 16 and 16', and pick up the compensating ring to cause it to rotate with the indexing gear.

An arresting lever or latching lever 23, pivotally mounted at 36 to swing in a horizontal plane, has a couple of teeth or projections 25 adapted to enter the outside row of teeth 3 on the magazine 1, to hold the magazine stationary against accidental movement at certain times. A spring (now shown) biases the latching lever 23 toward its latching position. An arm on this latching lever carries a pin or roller 24 which rides on a peripheral edge or rim of the upper indexing gear 18, to keep the latching teeth 25 out of engagement with the latching notches 3 during that part of the revolution of the indexing gear 18 in which the magazine is to be moved or fed either forwardly or backwardly. When the indexing movement of the magazine is completed, the feeler portion 24 of the lever 23 drops into a notch 26 or 26' in the rim of the gear 18, allowing the latching teeth 25 to move into engagement with the rack teeth 3 on the magazine 1, temporarily holding the magazine against further longitudinal movement and insuring that a picture slide compartment or pocket of the magazine is in proper position directly in line with the claw or slide transfer mechanism (conventional, and not illustrated) which takes the picture slide out of that particular pocket or which restores the slide to that pocket after completion of projection of that slide.

On a stationary braket 30 there is mounted a depressible key 33, adapted to be depressed to interrupt the projection process. Depression of this key 33 serves to swing a lever 35 on its pivot 34, so that a nose 32 on this lever engages a tongue 31 on an arm 27 of the latching lever 23, and swings the latching lever against the force of its biasing spring, to disengage the latching teeth 25 from the teeth 3 on the magazine. At the same time, depression of the key 33 operates the lever 46 which actuates a switch 47 connected through conductors 48 to the electric switching device indicated schematically at 49, which initiates immediately all of the electrical switching steps connected with the projection lamp control and required when the projection is interrupted. These switching steps include control of the immediate slide return in the correct order from the two slide projection gates or slide holders of the dual projector units, to return the slides from the respective projection gates (which may be designated as I and II) back into the magazine 1, the indexing gears 18 and 19 performing two final indexing cycles. When this key 33 is pressed to interrupt a projection process, it may be held in its depressed position by means of a conventional holding mechanism (not shown) similar to the holding mechanism frequently found in the handle of a retractable ballpoint pen, wherein a first depression of a plunger at the rear end of the pen handle or casing will project the ballpoint from the front end of the casing and hold it in projected position, and a second depression of the same plunger will release the ballpoint and allow its spring to retract it into the handle or casing. An example of a holding mechanism of this general type is disclosed in Rossman U.S. Pat. No. 3,889,283, dated June 10, 1975.

To determine the correct initial position of a magazine when first inserted into the projector, there is a stop member schematically shown at 50, to abut against the advancing forward end of the magazine when the magazine is first inserted. This stop member 50 may be a special member which serves only for limiting the initial insertion of the magazine, later moved out of the way so that the magazine can be properly advanced as required. Conveniently, however, this stop member schematically indicated at 50 may be formed by the near edge of the first tooth 25 of the latching lever 23.

Figure 3:
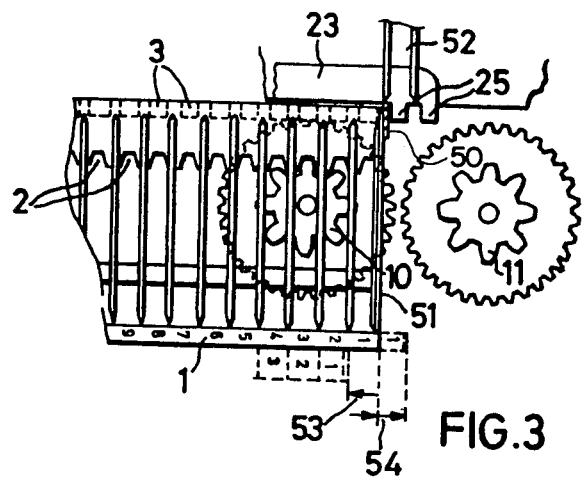
FIG. 3 is a partial plan view, with parts broken away, of a portion of the feeding mechanism with the forward end of a magazine in the position when first introduced into the feeding mechanism, and indicating in broken lines the first rearward step and subsequent two forward steps necessary to bring the first picture slide into position to be transferred to a projection gate of the projector.
Figure 4:
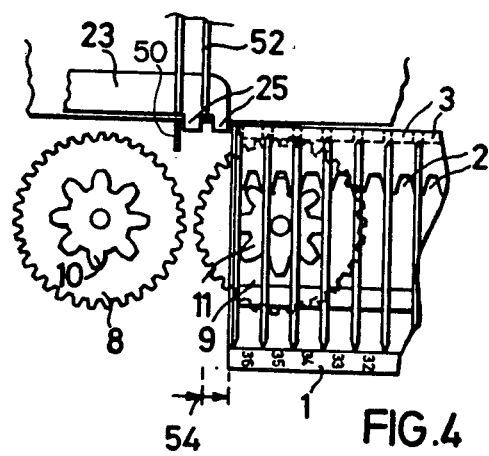
FIG. 4 is a view similar to FIG. 3, showing the rear end of the magazine leaving the feeding mechanism after completion of projection of all of the picture slides and return of the slides into the magazine.

As the slide magazine is inserted in its track or guideway and pushed along until it engages the stop 50, the rack teeth 2 on the magazine mesh with the first indexing or feeding pinion 10, and cause this pinion to turn. This causes corresponding turning of the second feeding pinion 11 and their respective gears 8 and 9, and the gear 5 and the two (upper and lower) star wheels 4, all of which are free to turn at this time. When the front end 51 of the magazine comes into contact with the stop 50, the magazine will be in the position shown in FIG. 3, with the first compartment or pigeon hole of the magazine not yet at the channel 52 in which the conventional slide feeding claw or transport mechanism operates. The feeding claw operates in a transverse plane containing the rotary axis 20 and passing midway between the feeding pinions 10 and 11. This transverse plane also contains the rotary axis 6 of the star wheels.

The regular pilgrim step movement can now commence. Bearing in mind that the normal pilgrim step movement is two steps forward and one step backward, it is seen that the pilgrim movement must commence with one backward step in order that, when followed by two forward steps, the first slide compartment 1 will be opposite the slide changing claw channel 52. So when the starting key is pressed and the feeding mechanism begins to operate, the pin 14 (or 14') on the indexing gear 19 turns the star wheel 4 in what may be called the reverse direction, moving the magazine back through the increment indicated at 53 in FIG. 3. While the magazine is stationary in this position, the claw mechanism operates as though to restore a previously projected picture slide to the magazine, but as there is no previously projected slide in the projector at this time, and no compartment of the magazine opposite the channel 52, no slide is actually moved. This is merely an "empty step". A moment later, the pins 12 and 13 (or 12' and 13') on the indexing gear 18 engage the star wheel 4 and turn it two steps in a forward direction, thereby advancing the magazine through two steps or increments indicated at 54 in FIG. 3. In this position of the magazine, with the first slide compartment now lying in the plane of operation of the slide transfer claw, the claw is operated to take the first slide from the first compartment and place it in the projection aperture or projection gate I of the projector. The projection gates of the dual projectors may be conveniently designated as I and II, although neither of them is shown in the drawings. Under the control of the electrical switching device schematically shown at 49, the illumination system for gate I is activated to fade in the first picture slide and project it on the viewing screen.

Immediately thereafter, and while the first slide is still in gate I and being projected, the indexing pin on the indexing gear 19 turns the star wheel one step in a reverse direction, moving the magazine backwardly one step. If there were a slide in projection gate II, the slide transfer mechanism would now return this slide from gate II to its compartment in the magazine, but at this time, during the few steps at the beginning of projection from a fresh magazine, there is not yet any slide in gate II. The program control 49, in known manner, has automatically kept the projection lamp of aperture II dark at this time, while the projection time of slide number 1 in gate I is still in progress.

In the next indexing cycle, the two pins on the indexing gear 18 turn the star wheel through two increments, moving the magazine two steps forwardly so that compartment number 2 is now in the slide transfer position. The slide transfer mechanism now takes slide number 2 from compartment number 2 and delivers it to projection gate II. The switching device 49 then changes the illumination to fade the slide in gate II in, simultaneously fading the slide in gate I out. Then, or perhaps even while the fading in and fading out is still in progress, a pin on indexing gear 19 turns the star wheel in the reverse direction, moving the magazine backward one step. This brings compartment 1 of the magazine back to the slide transfer channel 52. The transfer claw now takes the slide number 1 from gate I and puts it back in compartment number 1 of the magazine. Then the two pins on indexing gear 18 operate the star wheel to move the magazine two steps forwardly thus bringing compartment 3 of the magazine and its slide number 3 into the plane of operation of the slide transfer claw. The transfer mechanism now takes slide number 3 from the magazine and places it in projection gate I, whereupon the illumination is changed to fade in the picture slide in gate I and to fade out the slide in gate II. One rearward step of the magazine takes place under the influence of a pin on the indexing gear 19, so that compartment number 2 of the magazine is now in proper position to receive slide number 2 returned to it from gate II. The successive projection steps continue in this manner throughout the remainder of the slides of the magazine.

It will be noted that this process involves some steps which may be called "empty steps" at the beginning of projection from a fresh magazine. These empty steps are necessary, however, in order to keep the mechanism in proper synchronization, to have just as many "empty steps" available at the end of the series of projection of the slides, to insure that the last slide returns to the magazine in the proper counting order.

Figure 5:
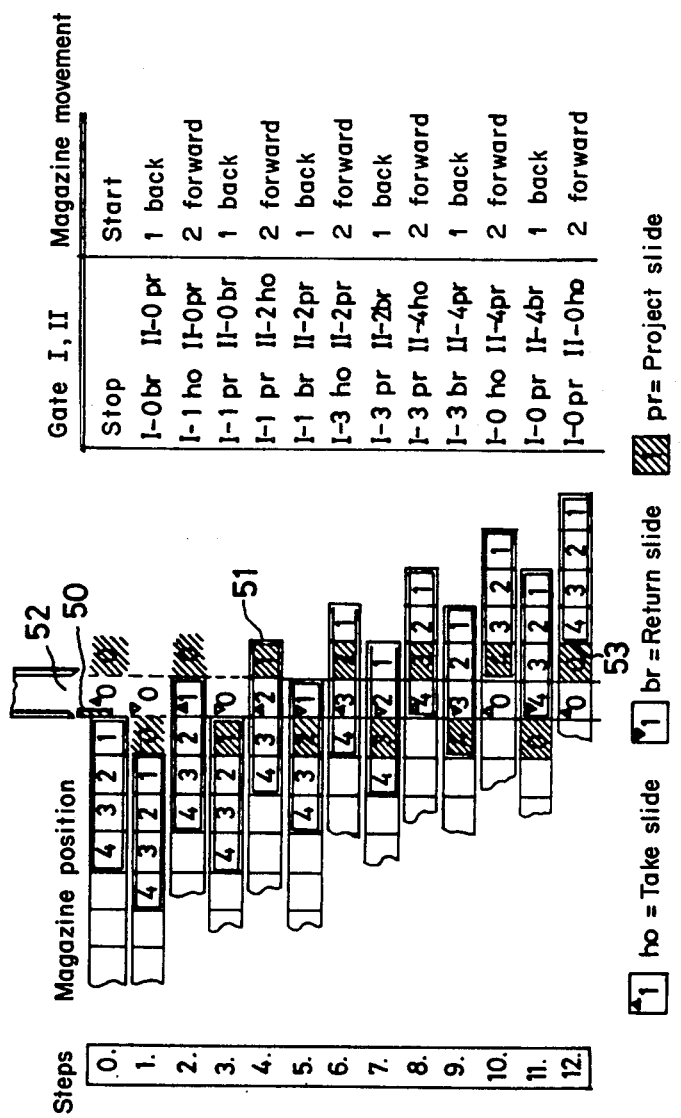
FIG. 5 is a diagram illustrating the increments of stepwise movement of the magazine and the picture slide movements which occur at each position of the magazine.

The process steps both at the beginning and the end of the magazine are illustrated diagrammatically in FIG. 5. Successive operating steps (not the actual step movements of the magazine) are numbered in the left hand column of FIG. 5, starting with operating position "0" in which the magazine has been inserted in its track and brought up against the stop 50. Reading to the right from the sequence step numbers indicated in the left hand column, various positions of the magazine are schematically shown, and to the right of them, an indication of which picture slides are being brought to, projected in, or brought back to the magazine from the respective projection gates I and II. In the extreme right hand column, the respective forward and backward feeding steps of the magazine are indicated.

As already indicated, operating step "0" indicates the initial position when the magazine is first introduced into its guideway or track, up against the stop 50. In operating step 1, the magazine is moved one step rearwardly (by operation of the pin on the lower indexing gear 19) and no slide is being projected. In operating step 2, the magazine is moved two steps forwardly (by action of the pins on the indexing gear 18) so that the first compartment 1 is in cooperative relation to the slide transport claw in the claw channel 52, and the claw takes slide number 1 from this compartment and puts it in projection gate I. In operating step 3, the magazine is moved one step rearwardly, and slide number 1, already in projection gate I, is illuminated and projected onto the viewing screen.

In operating step 4, the magazine is advanced two steps forwardly, slide number 1 is still being projected in gate I, and slide number 2 is moved by the claw or transfer mechanism to projection gate II. In the next operating step 5, the magazine moves one step rearwardly, slide number 2 in projection gate II is illuminated and projected, and slide number 1 is brought back from gate I into compartment number 1 of the magazine.

This sequence continues until all of the slides in the magazine have been projected, and all have been brought back properly and put into their correct compartments or pockets in the magazine. At the completion of projection of all the slides in the magazine, all the slides will be back in their correct pockets, in the correct order, the same order in which they were originally placed in the magazine when being sorted ready for projection. There will be some "empty steps" in the last few cycles of movement, just as there were at the beginning of the projection process.

The electric control 49 is programmed to fade one slide out and fade the other slide in simultaneously, when there are slides in both projection gates I and II, and is programmed to keep a projection gate dark when there is no slide in this projection gate. This programming of the electric control system is accomplished in known manner. Of course the fading in and fading out, and the proper control of darkness of gates having no slides therein, can all be accomplished by manually operated switches, if desired. Also manual switching may be used to control the length of time that each individual slide is projected, and the time that the motor 43 remains stopped and the indexing gears 18 and 19 remain stationary during projection of a particular slide, or these time intervals may all be controlled automatically in known manner by the electrical control system 49.

Because of the above mentioned lost motion mounting of the pins 14 and 14' on the indexing gear 19, it is possible to reverse the direction of projection at any time, for the purpose of repeating projection of individual slides or for projecting the entire sequence of slides in the magazine, in reverse order. When the start-reverse key is pressed from a forward projection at any time, all the control operations in the projector, such as the claw control, the lamp fade-over control of the picture apertures or projection frames I and II, as well as the pilgrim step cycle, have to be reversed immediately. This does not mean merely that what ran in the forward direction previously should now run in the backward direction. A reverse projection, including the requirement to withdraw and return slides for both gates I and II in the correct order of counting in this direction, means also that the pilgrim step functions with reversed signs relative to those described for the forward projection. The reversal of the terms in the titles of the diagrammatic table (FIG. 5) automatically results in the new direction of the operational cycle. Thus instead of one backward step where indicated in FIG. 5, there must now be one forward step, and instead of the two forward steps indicated in FIG. 5, there must now be two backward steps. As soon as the reversal has been effected, the projection of slides will occur in the reversed direction, with a correctly functioning pilgrim step program.

In making this reversal, one backward step of the indexing gear 19 has to be omitted, so that the pilgrim motion will be properly synchronized or in step. This is accomplished by the lost motion previously described, wherein the pin 14 on the gear 19 does not immediately start to move when the direction of motion of the gear 19 is reversed, but starts to move only after the lost motion is taken up when the pins 15 and 15' move to the opposite ends of their long arcuate slots 16 and 16'. Only then does the compensating ring 17 and its pins 14 and 14' begin to move in the opposite direction, with the reverse movement of the gear 19. During the time of the omitted indexing step by the indexing gear 19, resulting in the magazine remaining stationary, the slide transport claw can immediately return to the magazine the slide that it has just removed from the magazine, since the magazine compartment or pigionhole intended for this slide still remains in the same location as when the slide was taken out of this compartment. Thus a continuous reverse projection has been initiated after a previous forward projection, and the reverse projection will now proceed in the same manner until the last slide is returned into the magazine.

What is claimed is:

1. Magazine feeding mechanism for a dual slide projector wherein picture slides are to be taken in continuous succession from a single magazine and delivered alternately to two separate projection gates and then returned to the magazine in their original sequence, said feeding mechanism comprising
  a. magazine feed pinion means meshing with rack teeth on a slide magazine and effective, upon rotation of the pinion means, to feed the magazine;
  b. an indexing wheel operatively connected to said pinion means to cause turning of said pinion means upon rotation of said indexing wheel;
  c. a first indexing gear and a second indexing gear rotatably driven only during a slide change and rotatably driven simultaneously in opposite directions to the same angular extent during each slide change, said angular extent amounting to 360°/n where n is a positive integer greater than zero;
  d. indexing means carried by each of said indexing gears for engaging with and causing rotation of said indexing wheel wheel during said simultaneous rotation of said indexing gears;
  e. said indexing means carried by the first indexing gear being arranged for first turning said indexing wheel in one direction to one angular extent and said indexing means carried by the second indexing gear being arranged for subsequently turning said indexing wheel in the opposite direction to a different angular extent upon said simultaneous rotation of both indexing gears to the same angular extent.

2. The invention defined in claim 1 wherein said indexing wheel is a star wheel and the number of indexing elements on one of said indexing gears is different than the number thereof on the other of said indexing gears.

3. The invention defined in claim 1 wherein said indexing wheel is a star wheel, said two indexing gears are mounted to turn on a common axis of rotation, and wherein said indexing elements are in the form of pins each projecting axially from the respective indexing gear by which it is carried.

4. The invention defined in claim 3, wherein said indexing pins carried by each indexing gear project from a face thereof which is remote from the other indexing gear, and wherein said star wheel is in two parts spaced from each other in the direction of said axis of rotation of said indexing gears, one part being positioned to be engaged by an indexing pin carried by one of said indexing gears and the other part being positioned, to be engaged by an indexing pin carried by the other of said indexing gears.

5. The invention defined in claim 1, wherein said pinion means, indexing wheel, indexing gears, and indexing elements are so proportioned relative to each other that said simultaneous rotation of both indexing gears rotates said feed pinion means to feed a magazine one step in one direction and two steps in the opposite direction.

6. The invention defined in claim 5, wherein said indexing elements on both indexing gears are duplicated at locations spaced circumferentially from each other on their respective indexing gears, so that only a fraction of a revolution of both indexing gears is sufficient to feed the magazine one step in one direction and two steps in the opposite direction.

7. The invention defined in claim 1, wherein the directions of rotation of said indexing gears are reversible, further comprising means for delaying action of the indexing means carried by one of said indexing gears, upon reversal of the direction of rotation of such gear.

8. The invention defined in claim 7, wherein the indexing means carried by one of said gears is mounted on a compensating ring carried by such gear and mounted for limited rotation relative to such gear on which it is carried, and cooperating pin and slot means on said compensating ring and such gear, to carry said compensating ring along with such gear upon rotation in either direction after a lost motion interval of rotation of such gear without rotation of said compensating ring when the direction of rotation of such gear is reversed.

9. The invention defined in claim 1, wherein there is a slide changer plane at which picture slides may be taken from and returned to said magazine, further characterized by the fact that said magazine feed pinion means comprises two feed pinions on opposite sides of said changer plane, arranged so that a first feed pinion may mesh with said rack teeth on the magazine as an advancing magazine approaches said slide changer plane, both feed pinions may mesh with said rack teeth as an intermediate part of the magazine passes said slide changer plane, and the second feed pinion may mesh with said rack teeth as the rear end of the magazine advances beyond said slide changer plane.

10. The invention defined in claim 1 including a multi-arm latching lever with a latching arm having a latch part thereon for engaging the magazine to lock the magazine against feeding movement during a slide change operation, and further characterized by the fact that one of said indexing gears has a circumferential portion with a recess therein, and wherein said latching lever has a feeler arm with a feeler part riding on said circumferential portion to hold said latching part out of engagement with the magazine, said latching part coming into locking engagement with the magazine when said feeler part drops into said recess.

11. The invention defined in claim 10, including means for interrupting a slide projection cycle and concomitantly holding said latching lever in an unlocking position, and further characterized by the fact that said interrupting means includes a control key (33) and said means for concomitantly holding said latching lever in an unlocking position includes a releasing arm (27) on said latching lever and a part (32) operated by said control key for engaging said releasing arm.

12. The invention defined in claim 10, including means for interruping a slide projection cycle and concomitantly holding said latching lever in an unlocking position, and further characterized by the fact that an electrical control system (46, 47, 48) cooperates with said interrupting means to effect a final twofold indexing cycle of said indexing gears (18, 19) when the projection cycle is interrupted.

* * * * *

UNITED STATES PATENT OFFICE
CERTIFICATE OF CORRECTION

PATENT NO. : 4,063,465
DATED : December 20, 1977
INVENTOR(S) : Reinhard Sobotta

It is certified that error appears in the above-identified patent and that said Letters Patent are hereby corrected as shown below:

On the cover sheet, Item [30], foreign application priority data, for the priority date of "Sept. 24, 1977" read --Sept. 24, 1975--.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks